(12) United States Patent
Bensberg et al.

(10) Patent No.: US 11,609,934 B2
(45) Date of Patent: Mar. 21, 2023

(54) NOTIFICATION FRAMEWORK FOR DOCUMENT STORE

(71) Applicant: SAP SE, Walldorf (DE)

(72) Inventors: Christian Bensberg, Heidelberg (DE); Steffen Geissinger, Weisloch (DE)

(73) Assignee: SAP SE, Walldorf (DE)

( * ) Notice: Subject to any disclaimer, the term of this patent is extended or adjusted under 35 U.S.C. 154(b) by 264 days.

(21) Appl. No.: 15/961,075

(22) Filed: Apr. 24, 2018

(65) Prior Publication Data

US 2019/0325057 A1    Oct. 24, 2019

(51) Int. Cl.
*G06F 16/28* (2019.01)
*G06F 9/54* (2006.01)
*G06F 16/23* (2019.01)

(52) U.S. Cl.
CPC ............ *G06F 16/283* (2019.01); *G06F 9/542* (2013.01); *G06F 9/546* (2013.01); *G06F 16/2379* (2019.01)

(58) Field of Classification Search
CPC .... G06F 16/283; G06F 16/2379; G06F 9/542; G06F 9/546; G06F 16/21; G06F 11/30
See application file for complete search history.

(56) References Cited

U.S. PATENT DOCUMENTS

| | | | |
|---|---|---|---|
| 6,539,396 B1 * | 3/2003 | Bowman-Amuah | G06F 16/289 707/999.102 |
| 6,910,070 B1 * | 6/2005 | Mishra | H04L 67/14 709/227 |
| 9,740,757 B1 * | 8/2017 | Gilder | G06F 16/254 |
| 2005/0138081 A1 * | 6/2005 | Alshab | G06Q 10/06 |
| 2008/0172429 A1 * | 7/2008 | Lin | G06F 16/2343 |
| 2009/0048994 A1 * | 2/2009 | Applebaum | G06F 16/24573 706/45 |
| 2009/0254601 A1 * | 10/2009 | Moeller | G06F 9/542 709/201 |
| 2011/0246425 A1 * | 10/2011 | Munoz | G06F 11/1458 707/640 |
| 2012/0102402 A1 * | 4/2012 | Kwong | G06F 3/0484 715/705 |
| 2012/0109895 A1 * | 5/2012 | Zwilling | G06F 11/1471 707/648 |
| 2012/0324447 A1 * | 12/2012 | Huetter | G06F 9/5066 718/1 |
| 2014/0188840 A1 * | 7/2014 | Agarwal | G06F 16/2228 707/711 |
| 2016/0210313 A1 * | 7/2016 | Chen | G06F 16/21 |

(Continued)

*Primary Examiner* — Ashish Thomas
*Assistant Examiner* — Yohanes D Kelemework
(74) *Attorney, Agent, or Firm* — Buckey, Maschoff & Talwalkar LLC (57) ABSTRACT

Provided are systems and methods for implementing a database notification and statistics framework. In one example, the method may include receiving a message published by a database, the message including information about a database event performed by the database, determining a publication type of the message from among a plurality of publication types based on attributes included in the message, identifying one or more database components that have subscribed to the identified publication type of the message, and transferring the information about the database event included in the message to the one or more identified database components that have subscribed to the publication type of the message.

18 Claims, 6 Drawing Sheets

(56) References Cited

U.S. PATENT DOCUMENTS

| | | | |
|---|---|---|---|
| 2016/0299799 A1* | 10/2016 | De Smet | G06F 9/445 |
| 2016/0366236 A1* | 12/2016 | Herman | H04L 65/4084 |
| 2017/0220651 A1* | 8/2017 | Mathew | G06F 16/248 |
| 2018/0084073 A1* | 3/2018 | Walsh | H04L 67/2819 |
| 2018/0270605 A1* | 9/2018 | Wang | H04L 51/04 |
| 2019/0097961 A1* | 3/2019 | Kvalnes | H04L 51/48 |
| 2019/0171735 A1* | 6/2019 | Miller | G06F 16/2365 |
| 2019/0238428 A1* | 8/2019 | Guan | H04L 41/0893 |

* cited by examiner

NOTIFICATION FRAMEWORK FOR DOCUMENT STORE

BACKGROUND

A document database, also referred to as a document store, differs significantly from a traditional relational database (RDB). Relational databases generally store data in separate tables that are defined by a database administrator, in which data of a single data object may be spread across several tables. Meanwhile, document databases can store all information for a given object in a single database instance, and each stored object can differ from other stored objects. In other words, there may be no internal structure that maps directly onto the concept of a table, and the fields and relationships generally don't exist as predefined concepts. Instead, all of the data for an object is placed in a single document, and stored in the document database as a single entry. This makes mapping objects into the database a simple task, normally eliminating anything similar to an object-relational mapping. Accordingly, a document store is attractive for programming web applications, which are subject to continual change in place, and where speed of deployment is an important issue.

Traditional database systems are tightly coupled in that different components of a database often do not communicate with one another. Furthermore, external components added to a database often have different capabilities and programs than the internal components of the database. Therefore, each component of the database (internal and external) may perform its specific tasks without having an understanding of a state of the other components of the database. Accordingly, what is needed is a mechanism that enables communication between database components enabling a smarter database system.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a framework that supports the exchange of notifications and other information between components of a database. The database components can be both internal and external (e.g., $3^{rd}$ party, etc.) which are being used to enhance the database. The framework is an event-driven framework in which components can publish data related to events and components can subscribe to published data. Through implementation of the communication framework, the database can use additional information not previously available for making decisions on operations to perform. Furthermore, an event manager can provide a centralized entity through which multiple database components can subscribe to notifications and information from a single entity. Although not limited thereto, the example embodiments may be incorporated within a document store having a main memory that stores data in a document model format.

A database may continuously receive and process database operations (also referred to as transactions) such as read, write, modify, delete, select, and the like. At any given time, a database system can be simultaneously processing many different transactions across multiple different database nodes. Each database node may include a main memory that can hold one or more data stores such as a document store, a column store, a row store, and the like. In a document store, data may be organized in collections of memory and may have a document format such as a JavaScript Object Notation (JSON) document model format or an internal binary representation thereof. Each collection may be broken into a plurality of partitions and each partition may be further broken into a plurality of slices. The database described herein may operate on individual slices of data creating a more refined information and storage retrieval. Although more precise, the fine-grained operations may create large amounts of information due to the smaller size of individual data operations. Communication of the information can be aggregated and coordinated by the notification framework such that delivery of information may occur at intervals instead of every time a new notification is generated.

Figure 1:
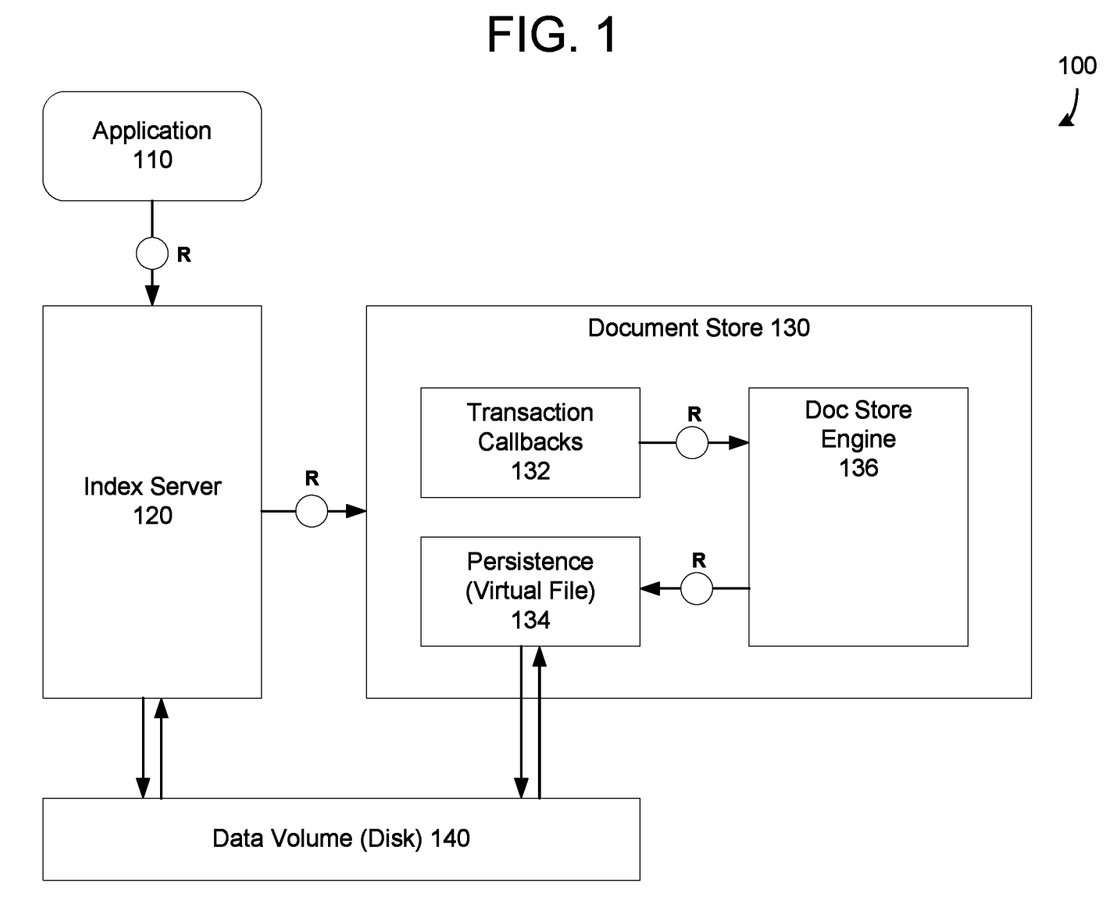
FIG. 1 is a diagram illustrating a database computing architecture including a document store in accordance with an example embodiment.

FIG. 1 illustrates a database computing architecture 100 in accordance with an example embodiment. Referring to FIG. 1, the architecture 100 includes an application 110 that interacts with an index server 120 for processing client/application requests. The index server 120 manages a document store 130 which may be an in-memory data structure such as dynamic random access memory (DRAM) or the like storing client data. The index server 120 and the document store 130 may both store data to disk 140. For example, the document store 130 may store checkpoints to disk 140, in response to the system requesting a checkpoint operation. Also, the document store 130 may be reloaded based on checkpoint data stored in disk 140 in the event of a power loss or other failure. The document store 130 may be implemented with the notification framework described herein.

The database computing architecture 100 may be incorporated within a database system such as an in-memory, column-oriented, relational database management system that functions as a database server to store and retrieve data as requested by software applications, also referred to herein as client applications. The database system may combine both online analytical processing (OLAP) and online transaction processing (OLTP) operations into a single system. The database system may store data in main memory (e.g., document store 130) rather than on disk 140 which provides for faster data access, and by extension, faster querying and processing. The document store 130 may be an additional data store besides a column store and a row store (not shown). Here, the document store 130 may be an independent store that can interact with either of the column store and the row store for data storage.

In the example of FIG. 1, the index server 120 may perform session management, authorization, transaction management and command processing. Although shown as separate components in the example of FIG. 1, in some cases, the index server 120 may include the document store 130 as the engines for processing the data. The client application 110 may submit structured query language (SQL) and multidimensional expression (MDX) statements to the index server 120 in the context of authenticated sessions and transactions which may be executed on data included in the document store 130 as well as other data stores. The index server 100 also manages persistence between cached memory images of database objects, log files and permanent storage files.

To work on the database, a client may design the application 110 using a design of their choice. A connection and session management process may be performed by the index server for creating and managing database clients and the corresponding applications such as client application 110. Once a session is established, client application 110 can communicate with the database using SQL statements, for example. For each session a set of parameters may be maintained such as auto-commit, current transaction isolation level, etc. Also, users may be authenticated either by the database itself (login with username and password) or authentication can be delegated to an external authentication providers such as an LDAP directory.

Client requests may be analyzed and executed by the index server 120. For example, incoming SQL requests may be routed to an SQL processor of the index server. Data manipulation statements may be executed by the SQL processor. As another example, other types of requests may be delegated to other components. For example, data definition statements may be dispatched to a metadata manager, transaction control statements may be forwarded to a transaction manager, planning commands may be routed to a planning engine and procedure calls may be forwarded to a stored procedure processor. An SQL statement may be processed in the context of a transaction. New sessions may be implicitly assigned to a new transaction. The transaction manager may coordinate database transactions, controls transactional isolation and keeps track of running and closed transactions. When a transaction is committed or rolled back, the transaction manager informs the involved engines (e.g., document store 130, column store, row store, etc.) about this event so they can execute necessary actions. The transaction manager also cooperates with a persistence layer of the index server to store data to disk 140 to achieve atomic and durable transactions.

Metadata can be accessed via the metadata manager component of the index server 120. In the database, metadata may include a variety of objects, such as definitions of relational tables, columns, views, indexes and procedures. Metadata of all these types may be stored in one common database catalog for all stores. The database catalog may be stored as tables in row store. The features of the database such as transaction support and multi-version concurrency control, are also used for metadata management.

The index server 120 may support different data stores (i.e., different engines) such as a document store 130, a column store, and a row store, and the like. As described herein, a store is a sub-system of the database which includes in-memory storage, as well as the components that manages that storage. For example, a row store may be a database row-based in-memory relational data engine. Meanwhile, a column store may store tables column-wise. The document store 130 (also referred to as a JSON document store) may store documents in the form of collections. The need to store unstructured or semi-structured data such as social media, multimedia, etc. has grown rapidly. SQL meanwhile requires structure to be specified in advance which means that any changes to the information schema require time-consuming alter statements to run on a table. The document store 130 overcomes this issue by loosening the restrictions on database schema and allows data to be grouped together more logically and naturally. In the document model, each record and its associated data is through of as a "document."

In the document store 130, all data related to a database object is encapsulated together. As a result, documents are independent units which make performance better in comparison to traditional database storage and make it easier to distribute data across multiple servers while preserving locality. Furthermore, application logic is easier to write because no translation is needed between objects in an application and SQL queries. Rather, the object model can be turned directly into a document. Also, unstructured or semi-structured data can be stored easily since a document may contain whatever keys and values the application logic requires. For transaction handling, the transaction callbacks 132 may receive requests from the index server 120 and process those requests on content stored in the document store engine 136.

The document store 130 may also include a persistence layer 134 which provides data persistency to disk 140. Like a traditional database, page management and logging may be performed by the persistence layer 134. According to various embodiments, the changes made to the in-memory database pages may be persisted through checkpoints. Checkpoints may be written to data volumes on the persistent storage 140 for which the storage medium is hard drives. All transactions committed in the database are stored/saved/referenced by a logger 134 of the persistence layer 134 in a log entry written to the disk 140 on the persistent storage. To get high I/O performance and low latency, log volumes may use flash technology storage. Furthermore, the persistence layer 134 is responsible for durability and atomicity of transactions. This layer ensures that the database is restored to the most recent committed state after a restart or other loss and that transactions are either completely executed or completely undone. To achieve this in an efficient way, the persistence layer 134 uses a combination of checkpoints and trimmed logs.

Figure 2:
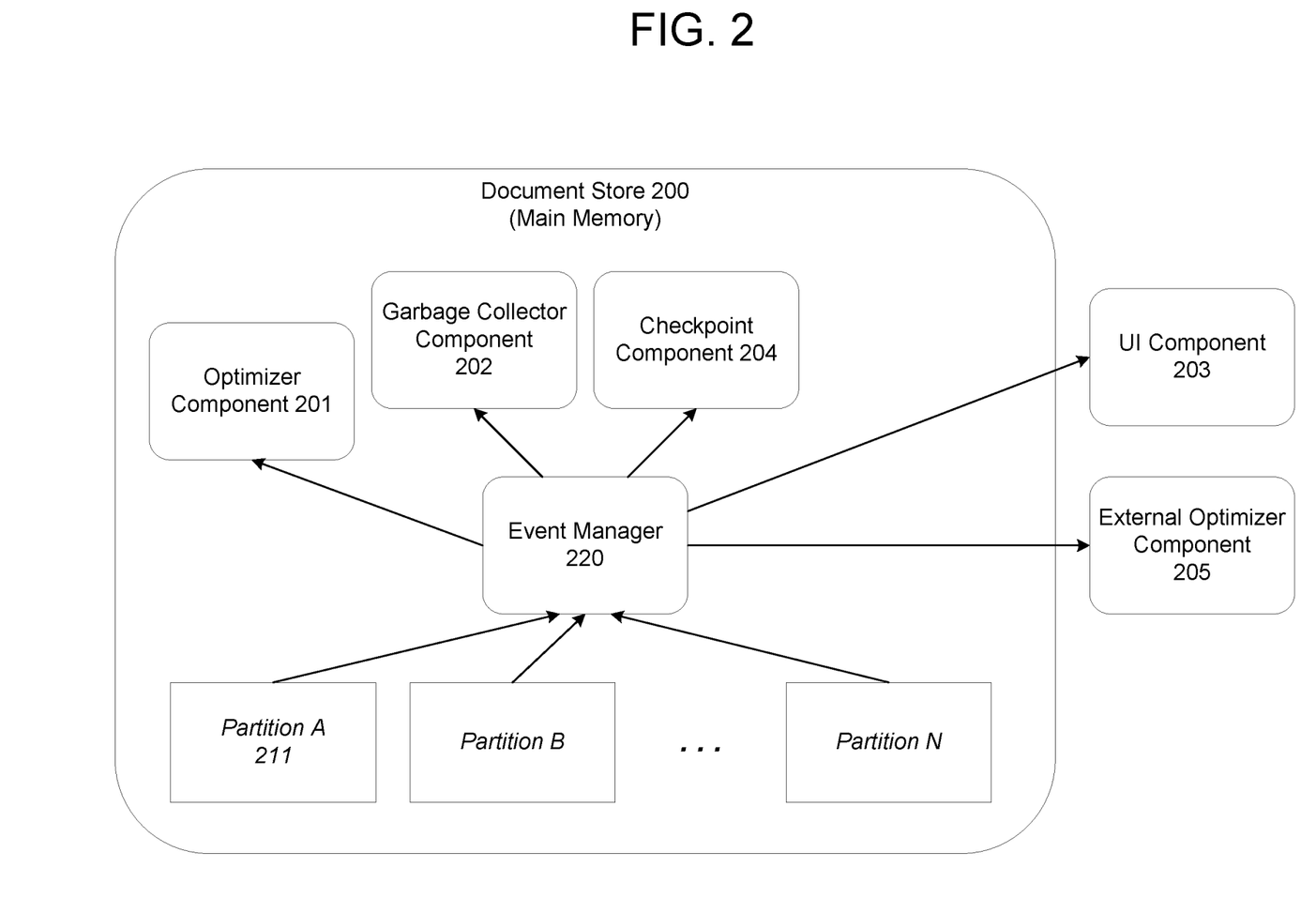
FIG. 2 is a diagram illustrating internal and external database components of a database system in accordance with an example embodiment.

FIG. 2 illustrates internal and external components of a database system in accordance with an example embodiment. Referring to FIG. 2, a document store 200 of a database is shown and may be implemented within main memory of a database node. The document store 200 may store a collection of data that is organized in a plurality of partitions 211. Further, partitions may be organized into a plurality of slices which are configured to store documents of the document store. When a first slice becomes filled, a next slice in the partition may be used, and so on. As transactions occur on the database, a number of processes may be running and executed. In the example of FIG. 2, the database processes (also referred to as components) include an optimizer 201, a garbage collector 202, and a checkpoint process 204, which are each internal within the document store 200. In addition, one or more external components (e.g., external optimizer 205) or a user interface (UI) 203 may be added to the database. In another embodiment the optimizer 201 might not internal within the document store 200, but instead be located in the index server 120 where it performs a more global optimization. This may be beneficial when a query touches more than one store, for example, a join of a document store collection with a column store table. Internal components (i.e. within the document store), database components (e.g. a "global optimizer"), and external components (e.g. a UI) suggest one uniform way (common mechanism) of handling all events and notifications.

For example, the optimizer 201 and the external optimizer 205 may have similar purposes such as optimizing queries using different protocols. As another example, the optimizer 201 may be used for optimizing queries, while external optimizer 205 may be used for optimizing data partitioning, or the like. The query optimizer may generate a most optimal execution plan for a database command such as a SQL statement. The optimizer may choose a plan with the lowest cost among all considered candidate plans. The optimizer may use available statistics to calculate cost. For a specific query in a given environment, the cost computation accounts for factors of query execution such as I/O, CPU, and communication.

A query is a request for information from a database. For example, a query might request information about a specific type of employee. If, for example, the optimizer statistics indicate that 80% of employees are of the specific type, then the optimizer may decide that a full table scan is most efficient. However, if statistics indicate that very few employees are of the specific type, then reading an index followed by a table access by row ID may be more efficient than a full scan. Because the database has many internal statistics and tools at its disposal, the optimizer is usually in a better position than the user to determine the optimal method of statement execution. The internal database optimizers (e.g., optimizer 201) may be triggered/launched from inside of a controller client interface while external database optimizers (e.g., external component 205) are triggered/launched from outside of the controller client interface and typically use third party database utilities thereby extending the optimizer to include third party optimization techniques.

The garbage collector 202 is a form of automatic memory management. The garbage collector 202 may attempt to reclaim garbage, or memory occupied by objects that are no longer in use by the program. The garbage collector 202 may perform differently based on the load of the database system as well as other factors such as the amount of free space, and the like. Furthermore, the garbage collector 202 may consume resources based on the memory being cleaned up. Meanwhile, the UI component 203 provides a front-end component usually in the form of a graphical user interface enabling a user to enter commands and interact with the underlying data stored in the partitions 211.

The checkpoint process 204 may be used for creating checkpoints on a slice-by-slice basis from the partitions 211 thereby reducing the level of complexity for a snapshot of the data (e.g., a consolidated representation of the data). Each slice may include its own log file that is kept and modified by the database as transactions occur on the respective slice. When a checkpoint request is received, the checkpoint process 204 may store a copy of the slice and a trimmed log file corresponding to the slice, to disk (not shown in FIG. 2). By persisting the slice content (the checkpoint) as well as the trimmed log file, the slice can be restored or otherwise loaded significantly faster than related recovery processes because only the log transactions in the trimmed log need to be performed rather than all transactions in the log before the unload or crash occurred. When a checkpoint exists, the backup size of the data is smaller and recovery is faster. Furthermore, the burden to replay the log during any type of load of a collection, not just backup and recovery, is significantly improved as a result of the trimmed log file.

According to various embodiments, the document store 200 may be implemented with the notification framework provided herein. To implement the framework, the document store 200 may include an event manager 220 that is configured to coordinate the exchange of notifications and other information (e.g., statistics, etc.) between the data partitions 211, the optimizer 201, the garbage collector 202, the UI 203, the checkpoint process 204, the external component 205, and the like.

According to various embodiments, the event manager 220 may provide a mechanism by which one component or database resource publishes event data that can be accessed by other components that have a subscription for the published data. Here, the subscription may be with the event manger 220 which receives requests and keeps track of which database components are consumers of which type of published data. Types of publication data may include, but are not limited to, loading/unloading data, index information, partition information, slice availability, and the like. Here, the event manager 220 may identify a particular publication type of the notification being published and identify one or more consumers of the publication type. In some cases, each notification generated and published by a producer component may be transferred to each subscribing/consumer component, in real-time. As another example, published notifications may be aggregated over time by the event manager 220, and may only be transferred to a consumer component in response the aggregated notifications reaching a threshold in size, time, or the like. As another example, the aggregated notifications may be transferred periodically, randomly, in response to a specific request, a specific occurrence happening within the data, and the like.

When the event manger 220 receives published data, the event manager 220 can identify which database components are consumers of the published data based on mapped producer and consumer information stored and managed by the event manager 220. Furthermore, the event manager 220 may store additional information about aggregate preferences of each consumer and also different mechanism preferences for transferring data from the event manager 220 to the consumer database components including a push of notifications, a pull of notifications, and the like. The event manager 220 may register components as publishers in advance and may also register components as consumers of publishers. In other words, the event manager 220 may provide a connection and management between producers that produce notifications and database components that consume the notifications.

Figure 3:
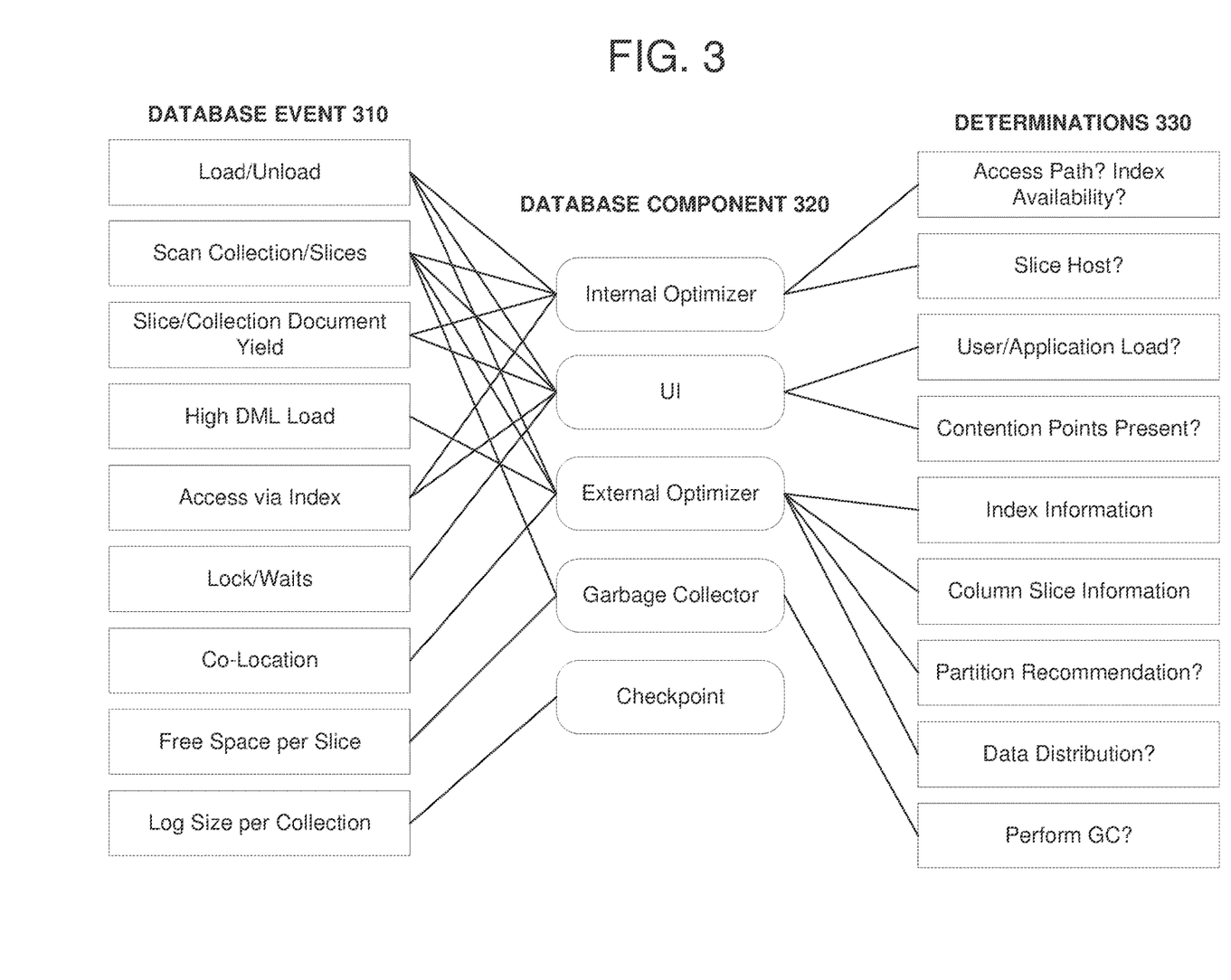
FIG. 3 is a diagram illustrating a mapping of database notifications to database components in accordance with example embodiments.

FIG. 3 illustrates examples of notifications that can be published by the database and which database components may subscribe to the notifications. Referring to FIG. 3, database events may cause notifications and/or statistics to be generated by the framework and provided to an event manager. The database events may have a publication type which corresponds to the database events 310 shown in FIG. 3, but the types of events are not limited thereto. The event manager may identify one or more consumers 320 that subscribe to each notification based on the publication type and provide the notification to the identified consumers. In some embodiments, the notifications may be pushed to the consumers as they are received by the event manager. As another example, the notifications may be aggregated and stored over time, and only transmitted when a pull request is received from a consumer, etc. FIG. 3 also illustrates non-limiting examples of determinations 330 that can be made by consumers 320 based on the notifications received from the database events 310.

Examples of database events 310 include loading and unloading of data to and from disk into main memory, scanning partitions/collections of memory including a plurality of slices to determine availability, identifying how many slices are included in each collection via a scan, determining a load on a collection of memory, an index access operation, a lock being enforced on a piece of memory, a co-location determination, an availability determination, a log slice determination, and the like. Different database components 320 may subscribe to notifications and statistics created by the database events 310. In this example, the database components 320 include an internal optimizer, an external optimizer, a garbage collector, a user interface, and a checkpoint process, however, embodiments are not limited thereto. More than one component may subscribe to data published by a single database operation.

Figure 4:
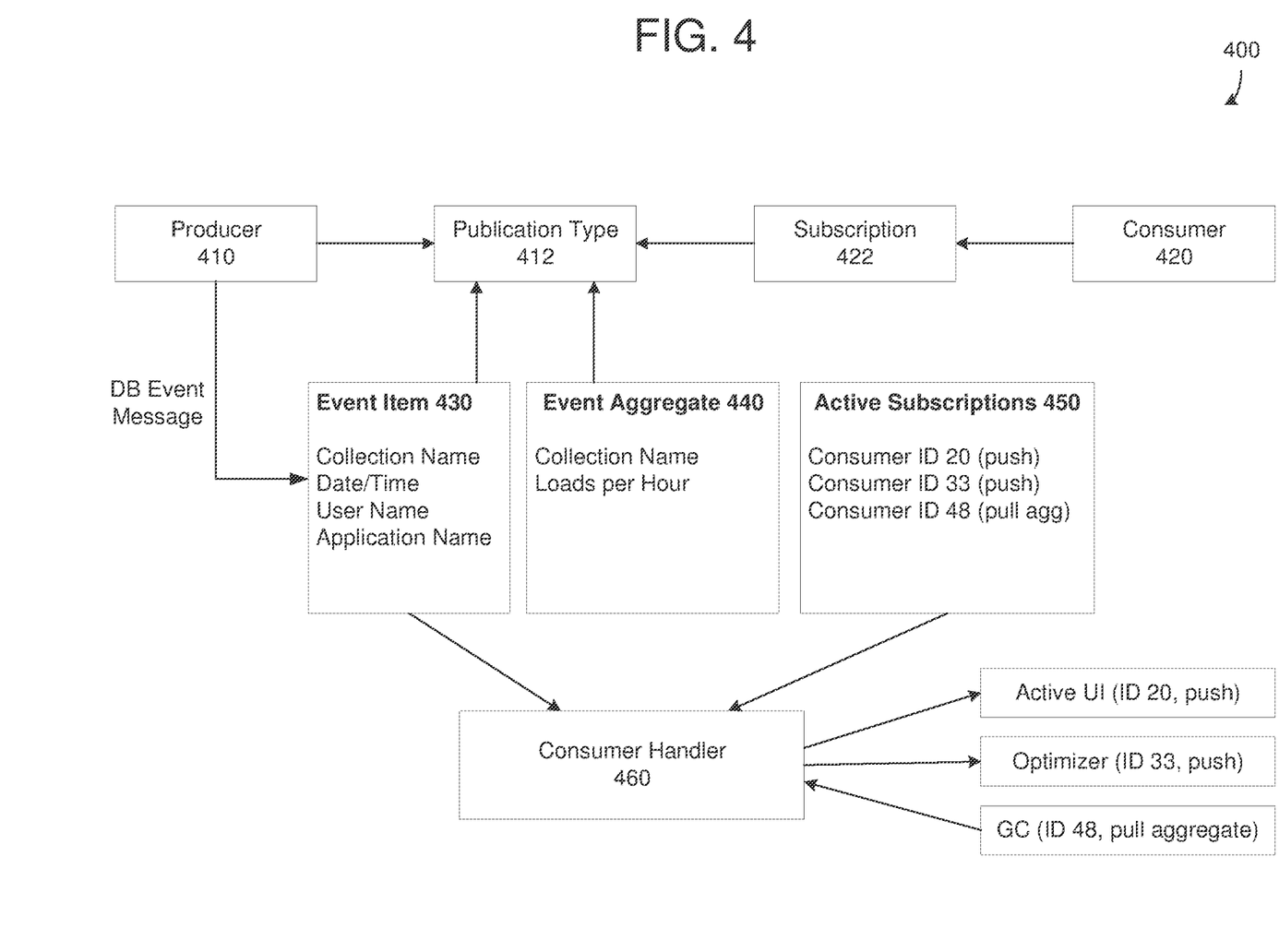
FIG. 4 is a diagram illustrating a notification and statistics framework for a database system in accordance example embodiments.

FIG. 4 illustrates a notification and statistics framework 400 for a database system in accordance example embodiments. Referring to FIG. 4, a producer 410 (such as a database event) provides a notification message having a publication type 412 which is identified by an event manager. The event manager may then push the notification to one or more consumers 420 who have previously registered to receive notifications from the publication type and therefore have a subscription 422. Each event may be received and processed by the event manager using the framework described herein.

The event notification messages may include various attributes/items 430 such as a collection name associated with the event, a data/time of the event, a program that cause the event, a user associated with the event, and the like. In some cases, the event notifications may be pushed to the consumer in real-time. As another example, the event notifications may be aggregated based on aggregation information 440 that is managed by the event manager. The event aggregation information 440 may include information what is being aggregated, how often an aggregation occurs, at what intervals, a trigger for transmitting the aggregated data to a consumer, and the like. In some examples, the aggregated notification information may be pulled from the event manager to the consumer 420 at specific requests, periodic intervals, after certain identified events, and the like.

The event manager also manages subscription information 450 which provides an identification of each consumer (e.g., consumer ID) that subscribes to each message received. The subscription information 450 may include an indication of whether the subscription is active, inactive, etc., what type of data transfer mechanism is being performed (e.g., push, pull, etc.) and whether the data transfer mechanism is to transfer real-time data or aggregated data. The event manager may also include a consumer handler 460 which establishes a communication channel with the database components and transfers the notifications and statistics received from producer 410 to the consumers 420 at specified locations.

An application request may cause a collection to be loaded. In this example, the loading of the collection can create an event item that identifies the collection by name, the data/time of the collection, a user associated with the load operation, an application working on the data being loaded, and the like. The loading of the collection may be a publication type of data load. In the example of FIG. 4, three database components (UI, GC, and Optimizer) subscribe to data load publications. In this example, each database component may receive published information differently even though it is published by the same producer. For example, each consumer may receive data during a live real-time push, aggregated over time and pushed, aggregated over time until a pull request is received, and the like.

Another example not shown in FIG. 4 includes an external optimizer that may be used to optimize how the memory is partitioned within the main memory. The external optimizer may provide a tool that optimizes how to partition data. The external optimizer may make suggestion on how to handle a data partitioning operation. For example, a first table of data of orders may be partitioned by order ID and order date, and a second table of data of deliveries corresponding to the orders may be partitioned by delivery ID and delivery data. A join may be performed between these two tables. However, these two tables are partitioned using different key variables (i.e., order ID vs. delivery ID). In this example, the external optimizer may identify a mechanism for joining the two tables based on statistics provided from programs managing the partitions via the framework. Based on statistics of the partitions, the external optimizer may determine a correlation between order date and delivery date and use this correlation as a way of comparing the two data tables to perform a join. For example, the database could join the two tables based on likely/predicted order dates determined from the delivery date in the delivery table which are correlated with actual order dates from the order table. Such an optimization may yield better performance if most data is being joined directly among partitions with matching data.

Figure 5:
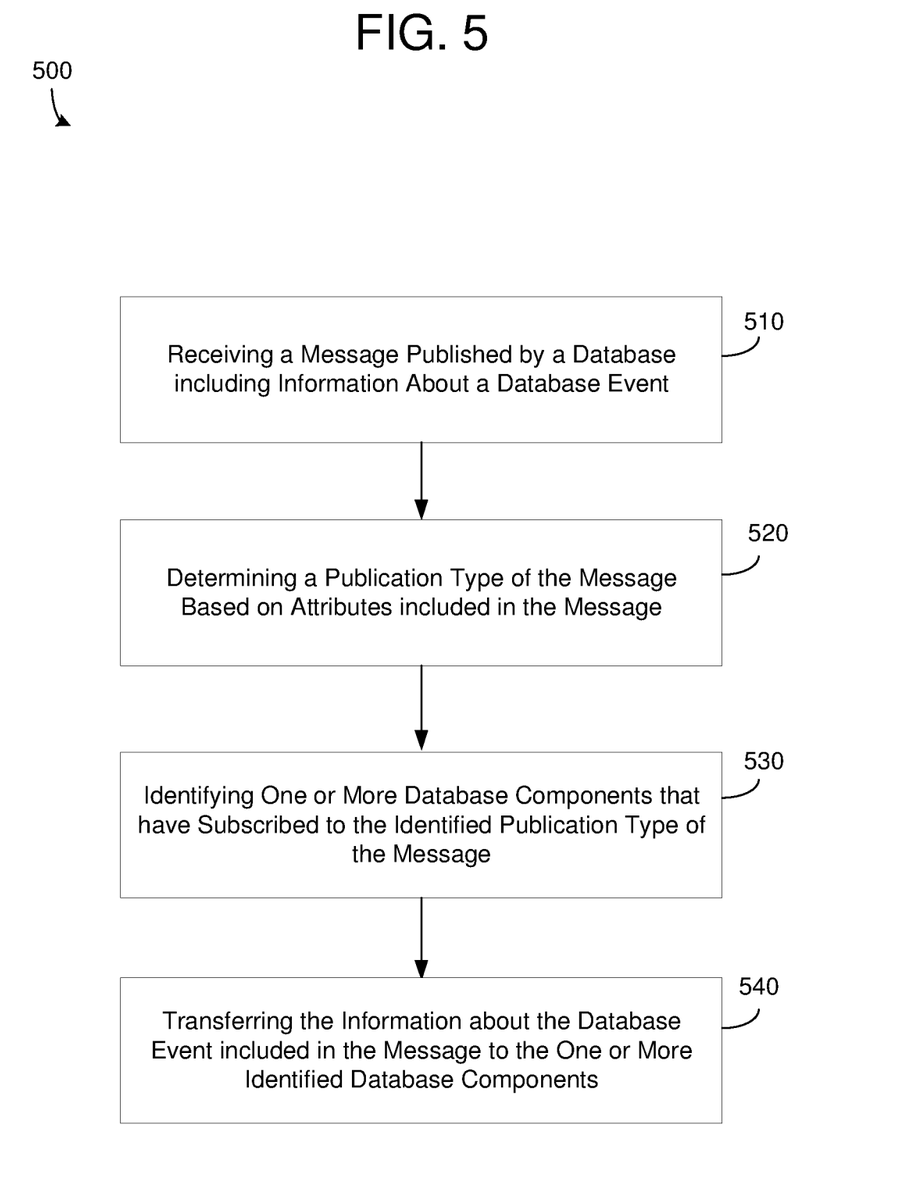
FIG. 5 is a diagram illustrating a method for managing events in a database system in accordance with an example embodiment.

FIG. 5 illustrates a method 500 for managing events in a database system in accordance with an example embodiment. As an example, the method 500 may be performed by a database node (e.g., an event manager, etc.) included within a main memory of a distributed database system. As another example, the method 500 may be performed by a computing device such as a server, a cloud platform, a computer, a user device, and the like. In some examples, the method 500 may be performed by a plurality of devices in combination. Referring to FIG. 5, in 510, the method may include receiving a message published by a database. For example, the message may include a notification about a database event and information such as statistics, etc. The message may include various attributes including one or more of an event identification, a timestamp at which the event occurred, an identification of a program that created the database event, a user associated with the event, and the like.

As an example, the database event may include one or more of a loading or unloading of data from the database, a data access operation on the database, and a scan of the database. As another example, the database event may include a transaction that is performed on the database such as storage, deletion, modification, select, etc. The database event may also include an operation performed by the database such as garbage collection, checkpointing, etc., and/or information about status of database components such as memory availability, index information, and the like. Notifications and statistics may be published to a central mechanism such as an event manager which may keep track and store published notifications and other information, aggregate the notifications and/or information, and transfer to the aggregated notifications and/or information to one or more consumer database components.

In 520, the method may include determining a publication type of the message from among a plurality of publication types based on attributes included in the message. The publication type may dictate which subscribers are to receive the published message and/or information included in the published message. In 530, the method may include identifying one or more database components that have subscribed to the identified publication type of the message. For example, the database components may include a garbage collector, a checkpoint process, a user interface, an internal optimizer, an external optimizer, and the like. In 540, the method may include transferring the information about the database event included in the message to the one or more identified database components that have subscribed to the publication type of the message. In some embodiments, prior to transferring the notification, the method may further include aggregating the information and/or notification about the database event with previously received information and/or notifications about a similar database event, and storing the aggregated information at an event manager.

In some embodiments, the transferring may include pushing the information about the database event from an event manager to the one or more database components based on a request from the event manager. In some embodiments, the transferring may include pulling the information about the database event from an event manager to the one or more database components based on a request from the one or more database components. In some embodiments, the transferring may include transferring the information about the database event to both of an internal database component and an external database component via a common mechanism such as the event manager.

Figure 6:
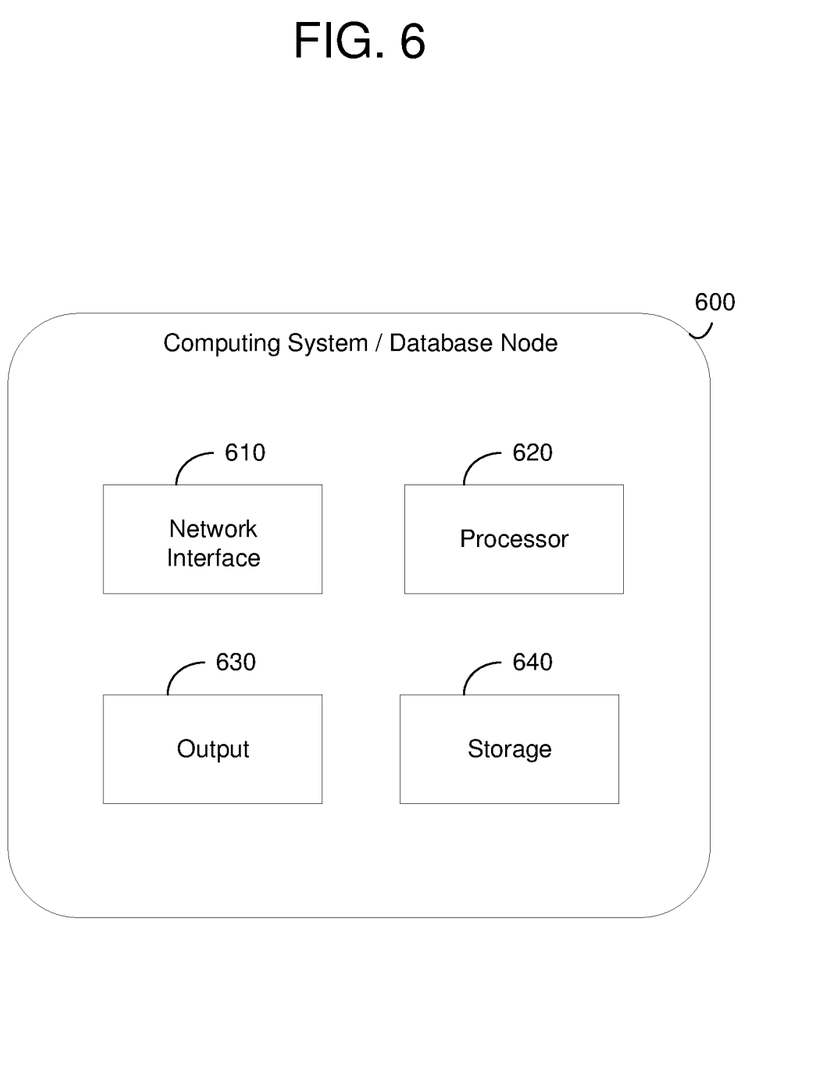
FIG. 6 is a diagram illustrating a computing system in accordance with an example embodiment.

FIG. 6 illustrates a computing system 600 in accordance with an example embodiment. For example, the computing system 600 may be a database node, a server, a cloud platform, a user device, or the like. In some embodiments, the computing system 600 may be distributed across multiple devices. Referring to FIG. 6, the computing system 600 includes a network interface 610, a processor 620, an output 630, and a storage device 640 such as an in-memory. Although not shown in FIG. 6, the computing system 600 may also include or be electronically connected to other components such as a display, an input unit, a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the computing system 1000, an externally connected display, a display connected to the cloud, another device, and the like. For example, the output 630 may include a port, an interface, a cable, a wire, a board, and/or the like, with input/output capabilities. The network interface 610, the output 630, or a combination thereof, may interact with applications executing on other devices. The storage device 640 is not limited to a particular storage device and may include any known memory device such as RAM, ROM, hard disk, and the like, and may or may not be included within the cloud environment. The storage 640 may store software modules such as an event manager program or other instructions which can be executed by the processor 620 to perform the method 500 shown in FIG. 5.

According to various embodiments, the processor 620 may receive a message published by a database component such as a data partition, an index, a program, or the like. For example, the message may be a notification and/or statistics including information about a database event performed by the database. Database events may be associated with data being stored, modified, deleted, added, or the like, to the database. The message may include one or more of an event identification, a timestamp at which the event occurred, and an identification of a program that created the database event. As another example, database events may provide information about an availability in the memory, loading and unloading of data, scans performed on the memory, and the like. The processor 620 may determine a publication type of the message from among a plurality of publication types based on attributes included in the message. The publication type may be associated with one or more of a loading or unloading of data from the database, a data access operation on the database, and a scan of the database.

The processor 620 may identify one or more database components that have subscribed to the identified publication type of the message. The subscriber components may be referred to as consumers and may include various programs or other components of the database such as the optimizer (internal or external), garbage collector, user interface, checkpoint process, and the like. The processor 620 may transfer the information about the database event included in the message to the one or more identified database components that have subscribed to the publication type of the message.

In some embodiments, the processor 620 may aggregate the information about the database event with previously received information about the database event, and store the aggregated information at the event manager. In some embodiments, the processor 620 may push the information about the database event from an event manager to the one or more database components based on a request from the event manager. As another example, the processor 620 may pull the information about the database event from an event manager to the one or more database components based on a request from the one or more database components. In some embodiments, the processor 620 may transfer the information about the database event to both of an internal database component and an external database component via a common mechanism.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a storage configured to store instructions; and
    a processor configured to execute the instructions stored in the storage, wherein when executed, the instructions cause the processor to:
        receive, via an event manager within a main memory of a database, a message published by a database partition that is located internally within the main memory, the message including information about a database event in which the database accesses a collection of data stored in the main memory of the database;
        determine a publication type of the message from among a plurality of publication types based on attributes included in the message, the publication type corresponding to the database event of the message;
        identify, via the event manager within the main memory, respective aggregation preferences of first and second database processes that are running internally within the main memory of the database and that have subscribed with the event manager for the identified publication type; and
        transfer message information from the event manager to the first database process in real time based on the aggregation preferences of the first database process, aggregate the message with other published messages over a period of time until a size threshold is reached and, after the size threshold is reached, transfer aggregated message information from the event manager to the second database process based on the aggregation preferences of the second database process.

2. The computing system of claim 1, wherein the publication type comprises one or more of a loading or unloading of data from the database, a data access operation on the database, and a scan of the database.

3. The computing system of claim 1, wherein the database event comprises at least one of transferring data of the collection of data from disk to the main memory including the collection of data and transferring data of the collection of data from the main memory to the disk.

4. The computing system of claim 1, wherein the processor is configured to push the information about the database event from the event manager to the first database process running internally within the main memory of the database.

5. The computing system of claim 1, wherein the processor is configured to pull the aggregated message information from the event manager to the second database process running internally within the main memory of the database.

6. The computing system of claim 1, wherein the first and second database processes comprise two of a garbage collector, a checkpoint process, and a query optimizer, which have subscribed to the identified publication type of the message.

7. The computing system of claim 1, wherein the processor is configured to transfer the information about the database event to the first database process via a push request and transfer the aggregated message information to the second database process via a pull request.

8. The computing system of claim 1, wherein the publication type comprises loading data to the database partition that published the message, and the processor is configured to identify the first and second database processes based on a mapping of the first and second database processes to the loading of data.

9. A method comprising:
    receiving, via an event manager within a main memory of a database, a message published by a database partition that is located internally within the main memory, the message including information about a database event in which the database accesses a collection of data stored in the main memory of the database;
    determining a publication type of the message from among a plurality of publication types based on attributes included in the message, the publication type corresponding to the database event of the message;

identifying, via the event manager within the main memory, respective aggregation preferences of first and second database processes that are running internally within the main memory of the database and that have subscribed with the event manager for the identified publication type; and transferring message information from the event manager to the first database process in real time based on the aggregation preferences of the first database process, aggregate the message with other published messages over a period of time until a size threshold is reached and, after the size threshold is reached, transfer aggregated message information from the event manager to the second database process based on the aggregation preferences of the second database process.

10. The method of claim 9, wherein the publication type comprises one or more of a loading or unloading of data from the database, a data access operation on the database, and a scan of the database.

11. The method of claim 9, wherein the database event comprises at least one of transferring data of the collection of data from disk to the main memory including the collection of data and transferring data of the collection of data from the main memory to the disk.

12. The method of claim 9, wherein the transferring comprises pushing the information about the database event from an event manager to the first database process running internally within the main memory of the database.

13. The method of claim 9, wherein the transferring comprises pulling the aggregated message information from an event manager to the second database process running internally within the main memory of the database.

14. The method of claim 9, wherein the first and second database processes comprise two of a garbage collector, a checkpoint process, and a query optimizer, which have subscribed to the identified publication type of the message.

15. The method of claim 9, wherein the transferring comprises transferring the information about the database event to the first database process via a push request and transferring the aggregated message information to the second database process via a pull request.

16. A non-transitory computer-readable storage medium storing program instructions that when executed cause a processor to perform a method comprising:

receiving, via an event manager within a main memory of a database, a message published by a database partition that is located internally within the main memory, the message including information about a database event in which the database access a collection of data stored in the main memory of the database;

determining a publication type of the message from among a plurality of publication types based on attributes included in the message, the publication type corresponding to the database event of the message;

identifying, via the event manager within the main memory, respective aggregation preferences of first and second database processes that are running internally within the main memory of the database and that have subscribed with the event manager for the identified publication type; and transferring message information from the event manager to the first database process in real time based on the aggregation preferences of the first database process, aggregate the message with other published messages over a period of time until a size threshold is reached and, after the size threshold is reached, transfer aggregated message information from the event manager to the second database process based on the aggregation preferences of the second database process.

17. The non-transitory computer readable medium of claim 16, wherein the publication type comprises one or more of a loading or unloading of data from the database, a data access operation on the database, and a scan of the database.

18. The non-transitory computer readable medium of claim 16, wherein the database event comprises at least one of transferring data of the collection of data from disk to the main memory including the collection of data and transferring data of the collection of data from the main memory to the disk.

\* \* \* \* \*